Dec. 9, 1930.   D. FAUERBACH   1,784,686
PROCESS AND APPARATUS FOR PRODUCING WAX BOTTLES
Filed June 23, 1927
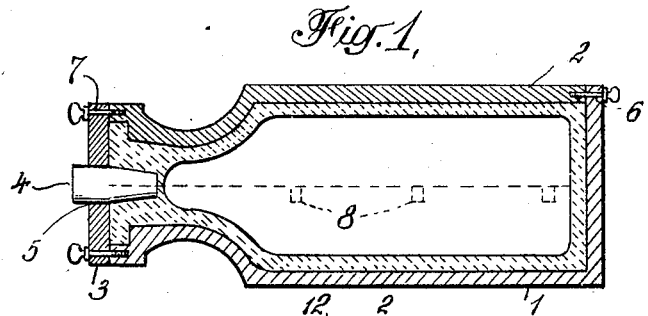
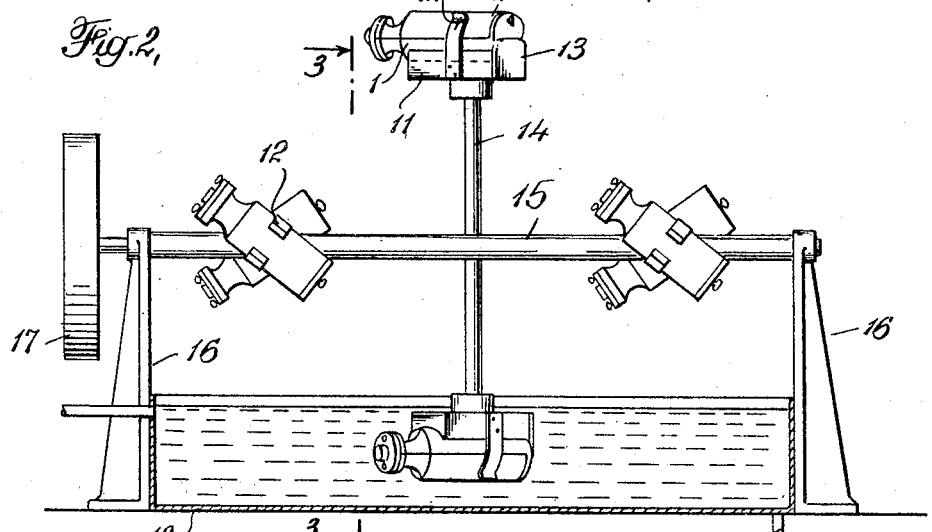
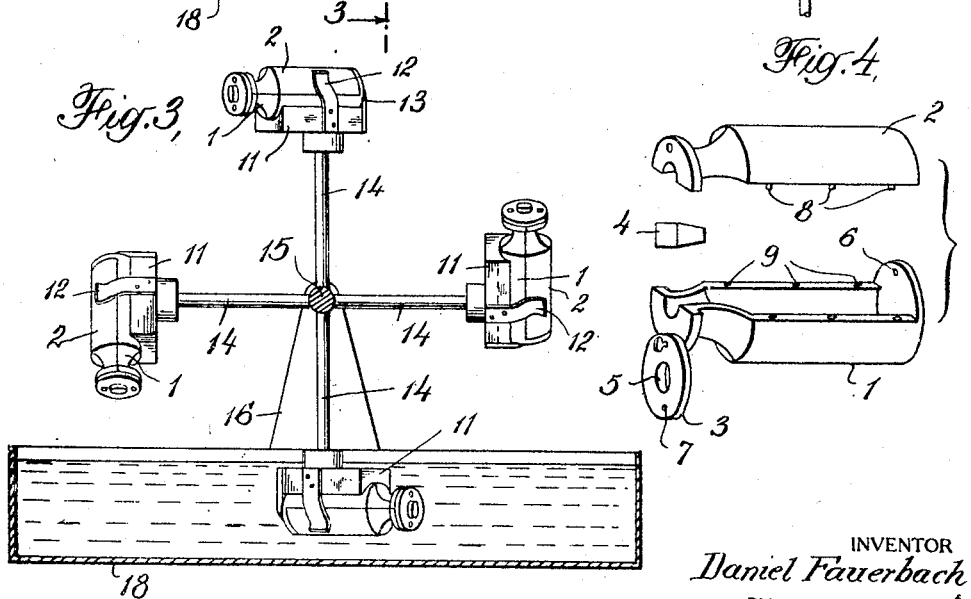
INVENTOR
Daniel Fauerbach
BY
Forbes Silsby
ATTORNEY Patented Dec. 9, 1930

1,784,686

UNITED STATES PATENT OFFICE

DANIEL FAUERBACH, OF WEST EASTON, PENNSYLVANIA, ASSIGNOR TO GENERAL CHEMICAL COMPANY, OF NEW YORK, N. Y., A CORPORATION OF NEW YORK

PROCESS AND APPARATUS FOR PRODUCING WAX BOTTLES

Application filed June 23, 1927. Serial No. 200,793.

This invention relates to a novel method of and apparatus for producing hollow elongated objects. The invention is particularly directed to the production of such objects by a casting or molding operation using plastic substances such as wax, paraffin, ceresine, etc., and in the following illustration will be shown as applied to the production of wax bottles, such as those commonly used for containing hydrofluoric acid.

The object of the invention is the provision of such a method and apparatus of extreme simplicity and ease of operation.

The general method of producing wax bottles or other objects is to charge a suitable mold with a quantity of molten liquid wax, and then either to manually shake the mold to cause the molten wax to be more or less uniformly distributed over the interior surface of the mold as the wax solidifies, or to place the mold upon a machine designed to perform similar operations mechanically. The manual method of shaking the mold is quite expensive, and the machines thus far devised for accomplishing this purpose have not been very satisfactory.

I have discovered that when producing elongated objects, and by this is meant objects having one axis greater than some other axis, that is, non-spherical hollow objects, such objects may be produced of uniform quality and wall thickness by imparting to the mold a simple arcuate or revolving movement such as is described more specifically hereinafter. Such movement necessitates neither rapid rotation nor violent shaking of the mold. This movement consists simply in causing an elongated mold to slowly revolve or traverse an arcuate path or orbit about a substantially horizontal axis, said path or orbit being in a plane at right angles to said axis, while maintaining the longitudinal axis of the mold at an angle other than a right angle with respect to said horizontal axis. To carry out the new process in a simple and convenient manner, I have devised an apparatus of simple construction as illustrated in the accompanying drawing. The invention will be best understood by reference thereto.

Fig. I is a sectional view through a separable mold containing a completely formed bottle, Fig. II is a side elevation partly in section of the molding apparatus, Fig. III is a sectional view upon the line 3—3 of Fig. II, and Fig. IV is a view of a separable mold in position to be assembled.

The mold illustrated in Figs. I and IV is a conventional type of separable mold and consists of the two complementary sections 1 and 2, a cap 3, and a tapered plug 4 adapted to be inserted in a centrally located opening 5 in cap 3. The section 1 and cap 3 are drilled at points 6 and 7 to receive threaded thumbscrews which pass through the respective openings into corresponding tapped holes in section 2. Small pins 8 are placed upon the engaging surfaces of section 2 in position to be inserted in corresponding holes 9 in section 1.

The mold when assembled is placed upon a supporting cradle 11 as shown in Fig. II by inserting the mold between spring clips 12 carried by supporting cradles 11. The cradles are provided with end plates 13 to aid in positioning the mold thereupon. Cradles 11 are carried by arms 14 attached to a horizontal shaft 15 and extending radially therefrom, and each cradle is placed upon its supporting arm in such position that the mold carried by the cradle will be held with its longitudinal axis at an angle with respect to the longitudinal axis of the shaft, said angle being other than a right angle. In the drawing this angle is shown as slightly less than 45°. A plurality of arms 14 are shown each carrying a supporting cradle 11 and mold, but the number or spacing of the arms upon the shaft is immaterial to my invention as will appear more clearly hereinafter.

Shaft 15 is journaled in and supported by bearing blocks 16 and is adapted to be rotated by means of pulley 17 driven from any suitable source of power. Underneath shaft 15 is placed a pan 18 adapted to contain a cooling bath of water or other cooling fluid. In the preferred embodiment of my invention, arms 14 are made of sufficient length such that the molds carried thereby will project under the surface of the cooling fluid in pan 18 while in their lowermost position of rotation.

The manner of practicing my invention by means of the above described apparatus is as follows: The two sections 1 and 2 of the mold are placed together and a thumbscrew inserted in opening 6 in the bottom of the mold. A quantity of molten wax, preferably ceresine, for example about one-third of the capacity of the mold, is then poured into the mold through the opening in the top thereof, cap 3 is swung into position so that opening 7 therein coincides with the corresponding opening in section 2, a thumbscrew is inserted and this and the other thumbscrew holding the cap are tightened, and then a plug 4 is inserted in opening 5 in the cap. The ceresine must of course be heated to a temperature sufficiently high that the ceresine will not congeal until it has had an opportunity to flow uniformly over the entire interior surface of the mold in the subsequent molding operation. The most favorable temperature will vary according to the length of the arcuate path and the speed of rotation but is readily determinable for each variation of these factors by simple test runs.

Shaft 15 is now caused to rotate at a relatively slow rate, preferably such that a mold may be removed from and a new mold inserted between the clips 12 in position upon the supporting cradle without the necessity of stopping rotation of the shaft. While the exact speed of rotation of the shaft is immaterial and will depend upon various factors such as the length of arms 14, it is to be clearly distinguished from the relatively high speeds of rotation employed in centrifugal casting. Cooling of the respective molds takes place as they revolve through the atmosphere and this is aided by the cooling bath. When solidification of the bottle has occurred within the mold which was longest on the machine, this mold is removed and another substituted so that the apparatus will be operating at full capacity at all times. Fig. I illustrates a completed bottle within the mold. In opening the mold the plug 4 is first removed, the thin wall of wax which has formed over the inner end of the plug is punctured with a sharp instrument to break the partial vacuum within the mold, and then the sections of the mold are separated and the completed bottle removed.

It will be observed that due to the rotation of the shaft, and to the placing of the supporting cradles at an angle with reference to the longitudinal axis of the shaft, the molds are caused to traverse an arcuate, circular path or orbit about the axis of shaft 15, which path is in a single plane at right angles to the axis of the shaft, and that while thus revolving the longitudinal axes of the molds are held at an angle with respect to the longitudinal axis of the shaft 15. In the specific embodiment of the invention shown each point upon the mold describes a circle about a horizontal axis corresponding to the axis of shaft 15. Any such circle projected from a fixed point upon the mold is for the purposes of this specification considered to be the path of the mold, and it will be seen that this path is in a plane at right angles to the horizontal axis of revolution.

I have discovered that by providing for this type of movement of the mold the molten ceresine contained therein will flow over the entire interior surface of the mold and form a hollow object having walls of substantially uniform thickness. The exact angle at which the supporting cradle and mold should be placed with reference to the axis of shaft 15 is relatively immaterial except that it should not be a right angle and preferably should be an angle not substantially greater than 45°. I prefer to employ an angle slightly less than 45° as shown. While angles greater than 45° may be used, I have found that it becomes increasingly difficult to obtain uniform distribution of the ceresine as the angle is increased above 45° and approaches a right angle. A right angle may not be used as this will not cause the ceresine to come in contact with all surfaces of the mold and form an article of uniform wall thickness. During one complete revolution of the mold as thus placed the molten wax is caused to flow completely over the side wall surfaces of the mold, and in addition due to the angular positioning of the mold the two end surfaces thereof are caused to assume positions at higher and lower levels, respectively, than the opposite end, thereby causing the wax to flow over the end surfaces, and thus over the entire interior surface, during each complete revolution.

In the manner of practicing my invention shown in the drawing, the mold is placed with its longitudinal axis in a plane parallel to the axis of shaft 15. This is not, however, essential and in fact the axis of the mold may lie in any plane provided merely that it is placed at an angle other than a right angle relative to the axis of revolution. For example, the axis of the mold may be maintained in a plane passing through or containing the axis of the shaft, and then be tilted while in this plane to lie at an angle other than a right angle with relation to the axis of the shaft.

It should also be understood that the length of arms 14 is immaterial except that for a given speed of rotation of shaft 15 a greater cooling action upon the mold is obtained the greater the length of the arms. In fact, the arms 14 may be entirely omitted if desired and the mold may be held in position upon the shaft, or even in such position that the center of the mold coincides with the axis of the shaft. By this is meant not that the longitudinal axis of the mold may coincide with the longitudinal axis of the shaft, but merely that the arms 14 may be so short, or be omitted altogether, that the axis of shaft 15 will be very close to or pass through the body of the mold. Hence it is to be understood that the terms "causing at least one point on the mold to traverse an arcuate path about a substantially horizontal axis" and "revolving about a substantially horizontal axis" as used in the claims are intended to include movement of the mold about an axis of revolution passing through the center or any point on the body of the mold and are not limited to the construction shown where the axis of shaft 15 is without the body of the mold.

I prefer to place shaft 15 in a horizontal position although it is not essential that it be so placed. The shaft may be tilted to a considerable angle if desired, although I have found that more uniform results are obtained if the shaft is placed in a horizontal position. Hence I intend that the appended claims be not limited to an exact horizontal axis of revolution.

In the foregoing specification and in the following claims I have defined the axis of the mold as lying at an angle other than a right angle with respect to the horizontal axis of revolution. It will be observed that I have not used the term "angle" in this respect in its strict geometrical sense as defining the relation between intersecting lines or planes, because as illustrated in the modification of my invention shown in the drawing the axis of the mold need not necessarily intersect the horizontal axis of revolution. Hence by this phraseology I intend to define merely an angular relation between the two axes, irrespective of whether they intersect or not. In the machine illustrated I consider the angle between the horizontal axis of revolution (the axis of shaft 15) and the axis of the mold to be that between the axis of the shaft and the projection of the axis of a mold while in its uppermost position upon a horizontal plane containing the axis of the shaft.

I claim:

1. The method of producing hollow elongated objects which comprises charging an elongated mold with molten material, and permitting said mold to cool while causing at least one point on said mold to traverse an arcuate path about a substantially horizontal axis, said path being in a plane at right angles to said axis, and the longitudinal axis of said mold being maintained at an angle with respect to said first named axis, said angle being other than a right angle.

2. The method of producing hollow elongated objects which comprises charging an elongated mold with molten material, and permitting said mold to cool while causing at least one point on said mold to traverse an arcuate path about a substantially horizontal axis, said path being in a plane at right angles to said axis, and the longitudinal axis of said mold being maintained at an angle with respect to said first named axis, said angle being not substantially over 45°.

3. The method of producing hollow elongated objects which comprises charging an elongated mold with molten material, permitting said mold to cool while causing said mold to traverse an arcuate path about a substantially horizontal axis, the longitudinal axis of said mold being maintained in a plane parallel to the first mentioned axis and at an angle with respect to the first mentioned axis, said angle being other than a right angle.

4. The method of producing hollow elongated objects, which comprises charging an elongated mold with molten material, and permitting said mold to cool while causing said mold to revolve in a single plane about a substantially horizontal axis, the longitudinal axis of said mold being maintained at an angle with respect to said first named axis, said angle being other than a right angle.

5. The method of producing hollow elongated objects, which comprises charging an elongated mold with molten material, and permitting said mold to cool while causing said mold to revolve in a single plane about a substantially horizontal axis, said plane being at right angles to said axis, and the longitudinal axis of said mold being maintained at an angle with respect to said first named axis, said angle being other than a right angle.

6. The method of producing hollow elongated objects, which comprises charging an elongated mold with molten material, and permitting said mold to cool while causing said mold to revolve in a single plane about a substantially horizontal axis, said plane being at right angles to said axis, and the longitudinal axis of said mold being maintained at an angle with respect to said first named axis, said angle being not substantially over 45°.

7. The method of producing hollow elongated objects, which comprises charging an elongated mold with molten material, and permitting said mold to cool while causing said mold to revolve in a circular path in a single plane about a substantially horizontal axis, said plane being at right angles to said axis, the longitudinal axis of said mold being maintained in a plane parallel to said first named axis, and at an angle with respect to said first named axis, said angle being not substantially over 45°.

8. An apparatus for producing hollow elongated objects comprising the combination of an elongated mold, means for supporting said mold, and means for revolving said mold about a substantially horizontal axis in a plane at right angles to said axis, said supporting means being constructed and arranged to maintain said mold with its longitudinal axis at an angle with respect to said first named axis, said angle being other than a right angle.

9. An apparatus for producing hollow elongated objects comprising the combination of an elongated mold, means for supporting said mold, and means for revolving said mold about a substantially horizontal axis in a plane at right angles to said axis, said supporting means being constructed and arranged to maintain said mold with its longitudinal axis at an angle with respect to said first named axis, said angle being not substantially over 45°.

10. An apparatus for producing hollow elongated objects comprising the combination of an elongated mold, means for supporting said mold, and means for revolving said mold about a substantially horizontal axis, said supporting means being constructed and arranged to maintain said mold with its longitudinal axis in a plane parallel to said first named axis, and at an angle with respect to said first named axis, said angle being other than a right angle.

11. An apparatus for producing hollow elongated objects comprising the combination of a substantially horizontal shaft, an elongated mold attached to said shaft in position to revolve about the axis of said shaft, said mold having its longitudinal axis at an angle with relation to the axis of said shaft, said angle being other than a right angle, and means for rotating said shaft.

12. An apparatus for producing hollow elongated objects comprising the combination of a substantially horizontal shaft, a mold support fixed to said shaft, an elongated mold carried by said mold support, said mold support being constructed and arranged to maintain the longitudinal axis of said mold at an angle with respect to the axis of said shaft, said angle being not substantially over 45°, and means for rotating said shaft.

13. An apparatus for producing hollow elongated objects comprising the combination of a substantially horizontal shaft, an arm laterally projecting therefrom, a mold support fixed to said arm, an elongated mold carried by said support, said support being constructed and arranged to maintain the longitudinal axis of said mold at an angle with respect to the axis of said shaft, said angle being not substantially over 45°, and means for rotating said shaft.

14. An apparatus for producing hollow elongated objects comprising in combination with an elongated mold, means for causing said mold to revolve about a substantially horizontal axis in a plane at right angles to said axis, and means for maintaining the longitudinal axis of said mold at an angle other than a right angle with respect to the first named axis.

15. An apparatus for producing hollow elongated objects comprising in combination with an elongated mold, means for causing said mold to revolve about a substantially horizontal axis in a plane at right angles to said axis, and means for maintaining the longitudinal axis of said mold at an angle not substantially over 45° with respect to the first named axis.

In testimony whereof, I affix my signature.

DANIEL FAUERBACH.